Patented Nov. 28, 1944

2,363,548

UNITED STATES PATENT OFFICE 2,363,548

MANUFACTURE OF HYDROXY-KETO COMPOUNDS HAVING A CYCLOPENTANOPOLYHYDROPHENANTHRENE NUCLEUS

Rupert Oppenauer, Amsterdam, Netherlands; vested in the Alien Property Custodian No Drawing. Application May 1, 1940, Serial No. 333,012. In the Netherlands June 27, 1936

3 Claims. (Cl. 260—397.4)

This invention relates to manufacture of hydroxy-keto compounds having a cyclopentanopolyhydrophenanthrene nucleus; and it comprises a process in which an organic compound, containing a cyclopentanopolyhydrophenanthrene nucleus and having keto and non-tertiary hydroxy groups attached in positions 3, 20 and 21, is subjected to the action of a metal alcoholate in the presence of an inert solvent, whereby isomerization and/or dismutation takes place. The invention also includes, as a novel composition of matter, the reaction products of the described process which comprise the isomers and dismutation products of said organic compound; all as more fully hereinafter set forth and as claimed.

This application is a continuation-in-part of my copending application, Serial No. 150,758, filed June 28, 1937, now Patent No. 2,229,599. In this prior application I have described and claimed the same generic invention as that which is disclosed in the present application but the present application is directed to the treatment of compounds having keto and hydroxy groups in positions 3, 20 and 21 and to the products resulting from said treatment.

The raw materials employed in the production of the 3-keto-17-hydroxy compounds having a cyclopentanopolyhydrophenanthrene nucleus, are usually the isomeric 3-hydroxy-17-keto compounds. Thus testosterone, which is a 3-keto-17-hydroxy compound, is usually prepared from dehydroandrosterone, which is a 3-hydroxo-17-keto compound. The 3-keto-17-hydroxy compounds, such as testosterone and dihydrotestosterone for example, not only have a greater activity than the isomeric 3-hydroxy-17-keto compounds but in addition they often show another physiological action, for example on the seminal vesicle and prostata.

The prior art methods which have been developed for the production of the 3-keto-17-hydroxy compounds from the isomeric 3-hydroxy-17-keto compounds or from natural starting materials containing such compounds have had the disadvantages that they are complicated and that the reactions employed do not produce the desired compounds directly but only via intermediate products, such as the hydroxy-esters, as described by Ruzicka, Helv. Chim. Acta 18, 1478 (1935), for example.

I have found that the desired compounds can be produced in a very simple and direct way by means of an isomerization reaction in which the raw materials are treated with lower molecular metal alcoholates in the presence of inert solvents. By this treatment there are formed not only the lower molecular alcohols derived from the alcoholate employed but also the alcoholates of the 3-hydroxy-17-keto compounds, the latter having the property, in the presence of an inert solvent, of undergoing isomerization to form the desired 3-keto-17-hydroxy compounds with substantial yields which can then be recovered in the form of pure crystals. I have found that this isomerization reaction is applicable to all hydroxy-keto compounds having a cyclopentanopolyhydrophenanthrene nucleus in which it is theoretically possible for at least one of the hydroxyl groups to be replaced by or to exchange places with a keto group. This means that at least one of the hydroxyl groups must be non-teritary. The hydroxyl and keto groups may be attached to one of the rings in the cyclopentanopolyhydrophenanthrene nucleus or to a side chain attached to said nucleus, for example in the 17 position. The more important compounds which are operative in my process are those containing at least one secondary hydroxyl group and in which the keto and hydroxyl groups are attached to different rings. By this method I have succeeded in converting the less active 3-hydroxy-17-keto compounds of the androsterone and dehydroandrosterone type into the more strongly active 3-keto-17-hydroxy compounds of the dihydrotestosterone and testosterone type, for example.

My process can be generally applied to the isomerization and dismutation of hydroxy-keto compounds of the types described and in which it is desired to convert these compounds into their isomeric hydroxy-keto compounds or into their polyalcoholic or polyketonic derivatives. My process is not limited to the use of the hydroxy-keto compounds in their pure state but crude or natural products, such as urine extracts, which contain hydroxy-keto compounds of the types defined are useful in my process. The reaction products and compounds obtained in this invention are useful as pharmaceuticals.

Various metal alcoholates can be used in the described process among which there can be mentioned sodium ethylate, aluminum isopropylate, chloro-magnesium-triphenylcarbinolate and tertiary aluminum butylate. The inert solvent employed should be a substance having no reactive hydroxyl or keto groups. Gasoline, hexane, benzene and cyclohexane can be mentioned as examples.

The reaction of this invention may be effected with such a small quantity of metal alcoholate that the reducing action produced by the alcoholate is negligible. Primary and secondary alcoholates can be employed but the tertiary alcoholates are more advantageous. In some cases, particularly when primary or secondary alcoholates are used, I advantageously remove the low molecular alcohol by evaporation, for example in vacuo, at the beginning of the reaction. During the reaction a certain quantity of diol and dione derivatives is formed and it is possible, if desired, to adapt my reaction to the production of these particular compounds. The hydroxy-ketone fraction can be easily separated from the diol-dione fraction by known methods. Either of these fractions can be treated again with a metal alcoholate, preferably a tertiary alcoholate, in accordance with my invention in order to produce an increased yield of the other fraction. Before effecting this re-treatment, one of the components of the fraction to be re-treated may be separated. For example, it is possible to separate testosterone from the hydroxy-ketone fraction by known methods, before re-treatment of the residue. When re-treating the diol-dione fraction, it is advantageous to have present substantially equal numbers of hydroxyl and keto groups.

Which of the two fractions should be re-treated depends, of course, upon whether it is desired to recover one of the hydroxy-ketone compounds, which are formed in the process, or crystallized diols and diones. In the treatment of dehydroandrosterone by my process, for example, it is possible to recover either testosterone or androstendiol and androstendione, the latter compounds being recovered from the diol-dione fraction and the former from the hydroxy-ketone fraction. If it is desired to obtain a hydroxy-ketone compound, the diol-dione fraction may be subjected to a treatment, this fraction usually being mixed with the unconverted hydroxy-ketone which is first separated from the hydroxy-ketone fraction. On the other hand if it is desired to recover diol and dione compounds, the hydroxy-ketone fraction should be subjected to re-treatment. Since substantially no by-products are formed in my reaction, it is possible by successive re-treatments to increase the yield of the desired compound or compounds to approximately the theoretical yield. It is also possible, of course, to obtain by my method various mixtures of compounds having a certain physiological action, for example a greater or smaller action on the growth of the capon's comb with a correspondingly smaller or greater action on the seminal vesicle, this result being possible by controlling the conditions under which the reaction is effected, such as temperature, concentration of solvent and time of reaction, or by choice of the fractions to be re-treated or by mixing the fractions to be re-treated in various proportions.

My invention can be described in somewhat greater detail by reference to the following specific example which represents an illustrative embodiment thereof.

I refluxed 500 mg. of delta 5-pregnene-diol-3,21-one-20 with 500 mg. of tertiary aluminum butylate and 20 cc. of benzene for several hours in an oil bath. Ether was then added and dilute sulfuric acid was added to remove the aluminum. The etheric solution was washed with water, dried and then evaporated.

By treatment with digitonine in alcohol of about 80 per cent concentration, approximately half the material was found to be precipitated as the digitonide. The compound precipitated by the digitonine was regenerated but was found to be inactive. The unprecipitated fraction was freed from the excess digitonine and then acetylated at room temperature by treatment with acetic acid anhydride in pyridine. The reaction products were poured into water and dissolved in ether, the pyridine being removed by repeated washing of the etheric solution. The solution was then dried and subjected to evaporation. It was found that 1-2 mg. of the residue, when dissolved in oil, gave a strong cortine activity in the Everse-de-Fremery test while the starting material was substantially inactive in this test. The active component in this product is believed to be the 21-acetate of delta 4-pregnene-dione-3,20-ol-21.

In the above reaction it is evident that theoretically no less than 8 different compounds are formed.

I have described what I consider to be the most advantageous embodiments of my process, it is evident that the specific procedures disclosed can be varied widely without departing from the purview of this invention. Modifications which fall within the scope of the following claims will be immediately evident to those skilled in this art.

What I claim is:

1. In the isomerization and dismutation of organic compounds containing a cyclopentanopolyhydrophenanthrene nucleus and having at least one keto group and at least one non-tertiary hydroxyl group attached thereto, the process which comprises treating a 3,21-dihydroxy-26-keto compound having a cyclopentanopolyhydrophenanthrene nucleus with a small amount of a metal alcoholate in the presence of an inert solvent.

2. The process which comprises subjecting delta 5-pregnene-diol-3,21-one-20 to the action of a metal alcoholate in the presence of an inert solvent under conditions favoring isomerization and dismutation.

3. As a new composition of matter, a mixture of the isomers and dismutation products of delta 5-pregnene-diol-3,21-one-20, said composition exhibiting a strong cortine activity in the Everse-de-Fremery test and being produced by subjecting delta 5-pregnene-diol-3,21-one-20 to the action of a metal alcoholate in the presence of an inert solvent and under conditions favoring isomerization and dismutation.

RUPERT OPPENAUER.